Feb. 13, 1962 D. J. KULLMANN 3,020,774
CONTROL MECHANISMS
Filed March 26, 1958 3 Sheets-Sheet 1

INVENTOR.
DONALD J. KULLMANN
BY John W. Michael
ATTORNEY

INVENTOR.
DONALD J. KULLMANN
BY John W. Michael
ATTORNEY

Feb. 13, 1962 D. J. KULLMANN 3,020,774
CONTROL MECHANISMS
Filed March 26, 1958 3 Sheets-Sheet 3
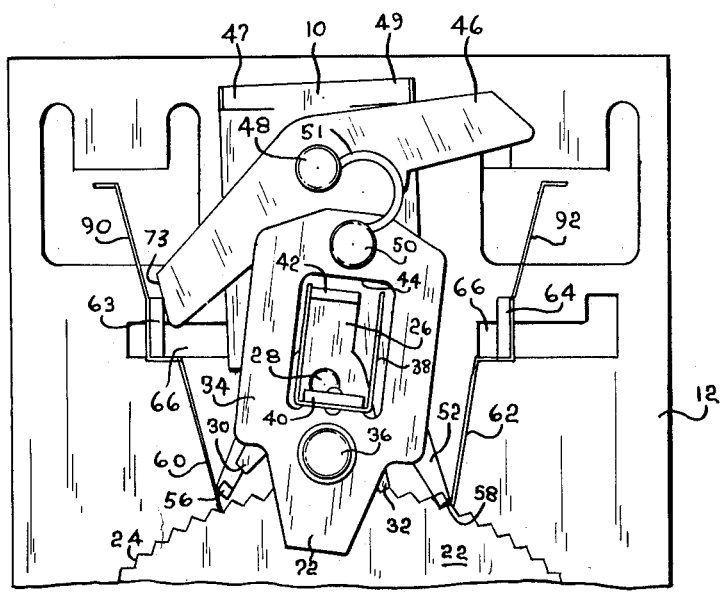
FIG. 5
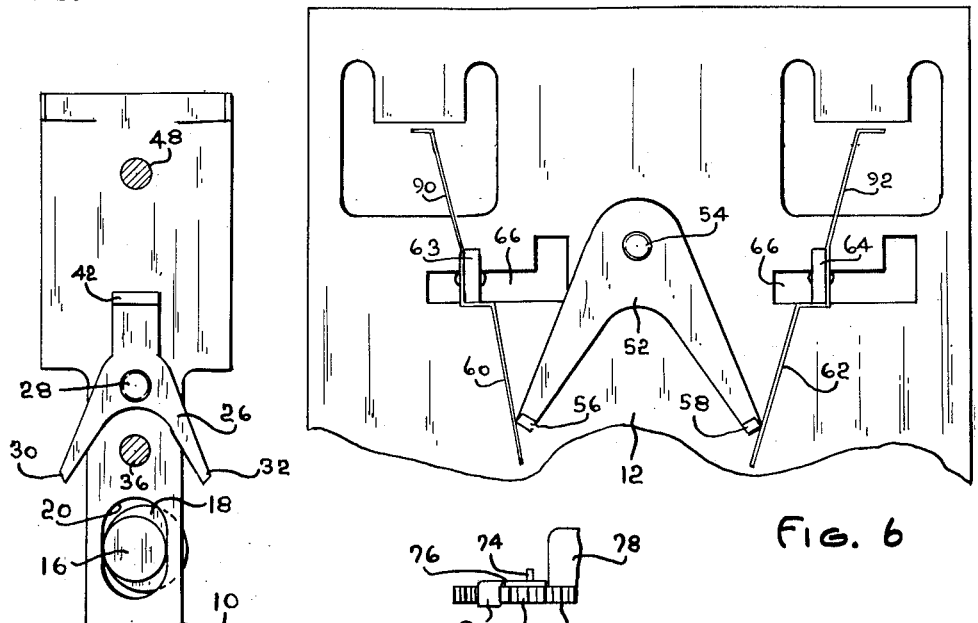
FIG. 6
FIG. 7
FIG. 8
INVENTOR.
DONALD J. KULLMANN
BY
John W. Michael
ATTORNEY

United States Patent Office 3,020,774
Patented Feb. 13, 1962

3,020,774
CONTROL MECHANISMS
Donald J. Kullmann, Milwaukee, Wis., assignor to Badger Meter Manufacturing Company, Milwaukee, Wis., a corporation of Wisconsin
Filed Mar. 26, 1958, Ser. No. 724,140
8 Claims. (Cl. 74—142)

This invention relates to control mechanisms and more particularly to a mechanism wherein the oscillations of a pivoted drive arm are counted to perform a control function at pre-set intervals defined by a given number of oscillations.

The object of the invention is to provide a device of this type which is accurate, reliable and can be readily adjusted to vary the pre-set intervals at which the control function is performed.

Another object is to provide such a device having a minimum of friction at its moving parts so it can be driven by a relatively small force.

Another object is to provide a device which will not malfunction due to inadvertent manual manipulation.

Devices embodying this invention may be employed wherever it is desired to automatically perform a control function such as the actuation of a switch at intervals defined by a given number of mechanical driving movements or signals from an outside source such as a meter, motor, cyclic mechanism, etc. For example, the device may be drivingly engaged with the drive spindle of a fluid meter to perform a control function at predetermined intervals defined by the volume of fluid passed by the meter to thereby control the operation of a water softening system or other process involving the flow of liquids.

The device includes a mounting plate having a drive arm pivotally mounted thereon and means for oscillating the drive arm. A ratchet wheel rotatably mounted on the plate is driven by a drive pawl pivotally mounted on the drive arm as the drive arm oscillates. A reversing means is provided to pivot the drive pawl between its two driving positions to thereby drive the ratchet wheel step-by-step in either direction. The reversing means includes a reversing link pivotally mounted on the drive arm and actuated by a pair of angularly spaced abutments on the ratchet wheel to thereby reverse the direction in which the ratchet wheel is driven by the drive pawl at regular intervals defined by a given number of drive arm oscillations which, in turn, are determined by the angular distance between the abutments on the ratchet wheel. Means are provided to readily adjust the angular distance between the abutments to thereby pre-set the reversing intervals. A control member for performing the desired control function is movably mounted on the mounting plate for actuation by an actuating member pivotally mounted on the drive arm. The actuating member is positioned by the reversing means to effect actuation of the control member and thereby perform a control function at intervals defined by a given number of drive arm oscillations.

The ratchet wheel is freely rotatably mounted on the mounting plate to minimize function and thereby reduce the driving force necessary to drive the device. A detent member pivotally mounted on the mounting plate is provided to engage the ratchet wheel and properly position and hold the wheel for step-by-step actuation thereof by the drive pawl. The detent is pivoted between one operating position and another by the control member depending on the direction the ratchet wheel is being driven by the drive pawl. Means carried by the control member are provided for preventing the drive pawl and detent member from being inadvertently manipulated to non-cooperating positions causing damage to the device.

Other objects and advantages will be pointed out in, or be apparent from the specification and claims, as will obvious modifications of the single embodiment shown in the drawings, in which:

FIGS. 3, 4 and 5 are a series of views similar to FIG. 1 showing the sequence of operation of the device as it moves through a reversing operation;

FIG. 6 is a fragmentary top plan view with the drive arm removed to show control member for performing a control function and the detent member actuated by the control member;

FIG. 7 is a fragmentary top plan view of the drive arm with some of the parts removed to show the means for oscillating the drive arm; and FIG. 8 is a fragmentary view in side elevation of the ratchet wheel and adjustable pointer.

Figure 1:
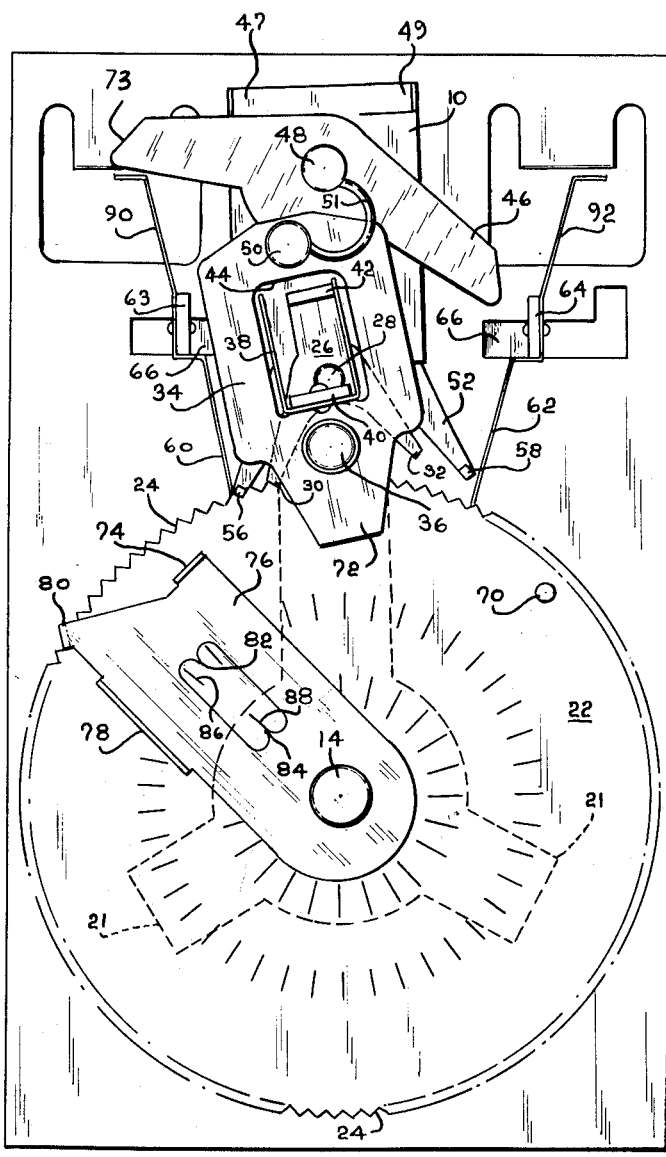
FIG. 1 is a top plan view of a device embodying the present invention.
Figure 2:
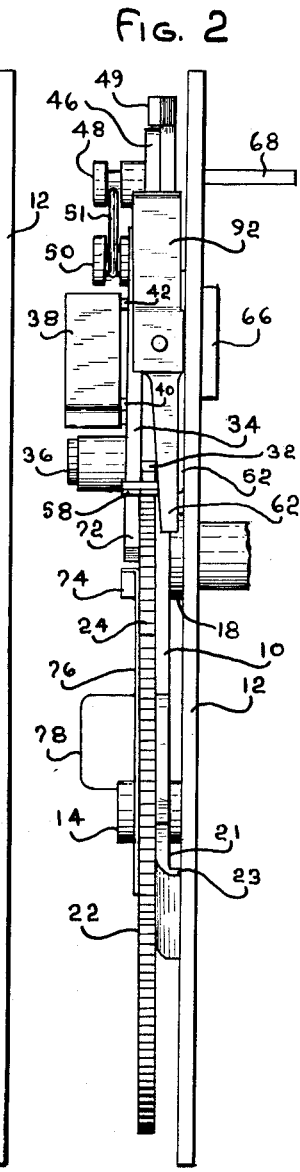
FIG. 2 is a view in side elevation of the device shown in FIG. 1.
Figure 3:
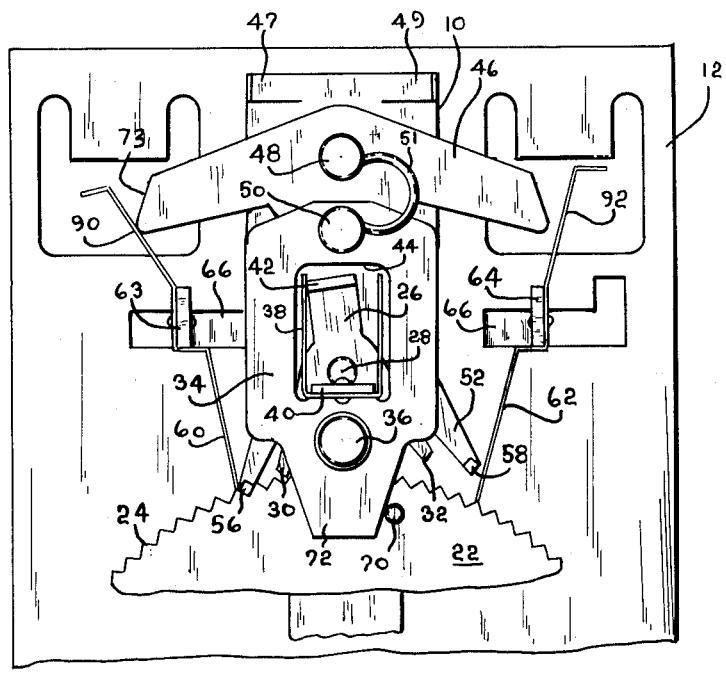

As shown in the drawings, the device includes a drive arm 10 pivotally mounted on a mounting plate 12 by a pin 14. Arm 10 is caused to oscillate back and forth through a predetermined angle about the axis of pin 14 by any suitable means such as that shown in FIG. 7 wherein an eccentric end portion 16 of a rotating shaft 18 is drivingly engaged in an elongated opening 20 in the drive arm. Stabilizer arms 21 on the drive arm having downwardly crimped edges 23 serve to maintain the drive arm in a plane parallel to the mounting plate as the drive arm is oscillated by shaft 18.

The mechanism for counting the oscillations of arm 10 includes a ratchet wheel 22 rotatably mounted on base 12 by pin 14 over drive arm 10. Wheel 22 has ratchet teeth 24 cut in the peripheral edge thereof for engagement by a double sided pawl 26 adapted to the ratchet wheel step-by-step in either direction. Pawl 26 (FIG. 7) is pivotally mounted on arm 10 by a pin 28 and has two noses 30 and 32 so formed that when the arm is oscillated either nose 30 or nose 32 will engage teeth 24 and drive the ratchet wheel step-by-step (one tooth at a time) in either a counter-clockwise or clockwise direction depending on the position of pawl 26 on arm 10.

The operating position of drive pawl 26 is controlled by a reversing means which includes a reversing link 34 pivotally mounted on arm 10 by a pin 36. A U-shaped leaf spring 38 fastened to a lug 40 struck out from link 34 will engage a lug 42 on pawl 26 extending up through a central opening 44 in the link to urge either nose 30 or 32 of the pawl into engagement with the ratchet wheel teeth depending on the position of the reversing link. Link 34 is pivoted from one position to another as tail portion 72 thereof is driven by arm 10 against one or the other of angularly spaced abutments 70 and 74 on ratchet wheel 22 as will be described more fully hereinafter.

An actuating member 46 pivotally mounted on arm 10 by a pin 48 is rocked from one operating position to the other (as defined by stops 47 and 49 formed at the end of drive arm 10) by reversing link 34 by means of a pin 50 pivotally connecting link 34 and member 46. An overcenter spring 51 connected between pins 48 and 50 acts to snap link 34 and member 46 into their respective operating positions and to urge the two parts into whichever of the two operating positions they occupy at any moment.

It is important in a device of this type that a minimum of work be required to operate the device. For this reason ratchet wheel 22 is mounted for free rotation on pin 14 to thereby minimize the energy required at shaft 18 to drive the device. Since the friction in the rotatable mounting of ratchet wheel 22 is kept at a minimum, a suitable detent means must be provided to properly position the wheel during the step-by-step rotation thereof by drive pawl 26. This is accomplished by a double-sided detent member 52 (FIG. 6) pivotally mounted on base plate 12 by a pin 54. Detent 52 has a pair of upstanding lugs 56 and 58 formed on the legs thereof adapted for alternate engagement with the teeth 24 of the ratchet wheel. One or the other of the detent lugs is urged into contact with the ratchet wheel teeth by leaf springs 60 and 62 mounted on lugs 63 and 64, respectively, extending through suitable openings in mounting plate 12 from a slidable control member 66. Control member 66 which is actuated by actuating member 46, as will be described hereinafter, can be adapted for actuation of any suitable control instrumentality such as an electric switch mounted on the underside of the base plate by means of mounting lugs 68 struck out from the plate.

Referring now to FIGS. 1, 3, 4 and 5, the sequence of operation of the device is as follows:

With reversing link 34 and control member 66 in the FIG. 1 position, nose 30 of drive pawl 26 and detent lug 56 of detent 52 are urged into engagement with teeth 24 of the ratchet wheel, as shown. As drive arm 10 is oscillated by rotating shaft 18, wheel 22 will be driven step-by-step, one tooth at a time, in a counter-clockwise direction (as indicated by the arrow). The ratchet wheel is properly positioned after each oscillation of the drive pawl by detent lug 56 which positively blocks any back-up of the wheel and limits forward movement to the angular distance between adjacent teeth.

Step-by-step counter-clockwise rotation continues until fixed abutment 70 formed on the upper surface of ratchet wheel 22 moves into a position whereby tail portion 72 of link 34 will be driven against it causing the link to pivot. This happens when abutment 70 reaches a point whereby it lies immediately adjacent the edge of tail 72 when at the same time drive arm 10 has reached the limit of its angular oscillation to the left (as viewed in the drawings). The succeeding one-half oscillation of the arm to the right (FIG. 3) will drive tail 72 against the now stationary abutment 70 causing link 34 to pivot about the axis of pin 36 against the bias of overcenter spring 51. As previously stated, detent lug 56 positively blocks back-up (clockwise movement) of the ratchet wheel and thereby holds the wheel stationary during the actuation of the reversing link which takes place as the drive arm oscillates with the ratchet wheel stationary.

Figure 4:
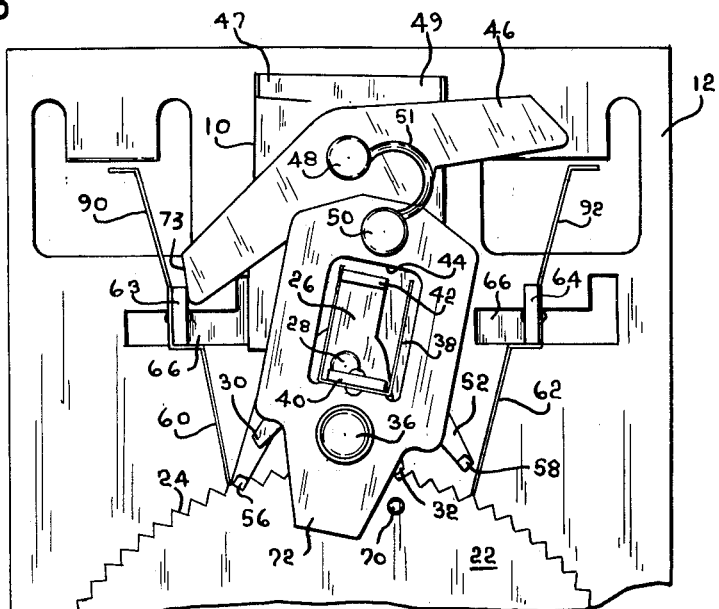

As the reversing link 34 pivots, actuating member 46 pivotally connected to link 34 by pin 50 will also pivot causing link 34 and member 46 to snap into the position shown in FIG. 4 under the bias of spring 51 which urges member 46 in position against stop 49 on arm 10. At the same time the left-hand leg of leaf spring 38 fastened to link 34 will engage lug 42 of pawl 26 to thereby pivot the pawl from the counter-clockwise driving position (FIG. 1) to the clockwise driving position (FIG. 4) wherein nose 32 of the pawl is urged into contact with teeth 24 of the ratchet wheel.

The drive arm has now reached the limit of its angular movement to the right (FIG. 4) with the left-hand edge 73 of member 46 lying adjacent the inner face of lug 63 on control member 66. As arm 10 oscillates back to the left, edge 73 will engage lug 63 and push control member 66 from right to left to thereby perform the desired control function and at the same time reverse the operating position of detent 52 causing detent lug 58 to engage the teeth of the ratchet wheel as shown in FIG. 5. The parts (FIG. 5) are now in position for step-by-step rotation of wheel 22 in a clockwise direction as arm 10 continues to oscillate.

It is noted at this point that the entire reversing operation of the device is accomplished by a single oscillation of the drive arm. The first half of the oscillation of arm 10 from left to right causes reversing link 34, actuating member 46 and drive pawl 26 to move from the position shown in FIG. 1 through the momentary position shown in FIG. 3 to the position shown in FIG. 4 and the second half of the oscillation from right to left causes control member 66 and detent 52 to move from the position shown in FIGS. 1, 3 and 4 to that shown in FIG. 5 to complete the reversing operation and position the parts for step-by-step clockwise rotation of wheel 22.

Nose 30 of drive pawl 26 will drive wheel 22 clockwise until an adjustable abutment 74 on a pointer arm 76 engages the left-hand edge of tail 72 of reversing links 34 to again reverse the parts in the manner previously described. The intervals between actuations of control member 66 are thus defined by a given number of drive arm oscillations and can be controlled by varying the angular position of pointer arm 76. This is accomplished by simply lifting the end of the pointer arm slightly by means of a tab 78 thereon to thereby disengage depending lug 80 (FIG. 8) from between the teeth of the ratchet wheel so that the pointer can be rotated to the desired position. Lug 80 not only holds the abutment 74 in the desired position but defines that position properly with respect to the step-by-step movement of the ratchet wheel to insure proper functioning of the counting mechanism during the reversing operation. The pointer arm may be provided with double pointers 82 and 84 (FIG. 1) for use with two separate sets of calibrations 86 and 88 on the ratchet wheel to permit pre-setting of the counting mechanism of the device in either one of two different applications.

As a precaution against malfunction due to manual manipulation of the actuating member and reversing link during operation, a pair of leaf-spring extensions 90 and 92 on lugs 63 and 64 of member 66 are provided. Assume, for example, that with the parts in the position shown in FIG. 1 and with leaf spring extension 90 removed, member 46 and link 34 were tripped manually causing nose 32 of pawl 26 to move into driving position but with detent lug 56 of detent 52 remaining in operating position to block clockwise rotation of the ratchet wheel. Now, as drive arm 10 oscillates from left to right pawl 26 will drive wheel 22 clockwise against the blocking action of the detent causing damage to the parts. The presence of spring extension 90, however, will cause control member 66 to slide as the control member comes down and thereby reverse the position of detent 52 preventing the detent and pawl from getting out of phase with each other. Spring extensions 90 and 92 also serve to prevent member 46 and link 34 from becoming stalled on dead-center at any time causing arm 10 to oscillate without driving the ratchet wheel.

Although but one embodiment of the present invention has been illustrated and described, it will be apparent to those skilled in the art that various changes and modifications may be made therein without departing from the spirit of the invention or from the scope of the appended claims.

I claim:

1. A device of the character described comprising a mounting plate, a drive arm pivotally mounted on said plate, means for oscillating said drive arm, a ratchet wheel freely rotatably mounted on said plate, a drive pawl pivotally mounted on said drive arm for movement between one driving position and another, said drive pawl adapted to drive said ratchet wheel step-by-step in either direction when said drive arm is oscillated depending on the position of said drive pawl, reversing means adapted to pivot said pawl from one driving position to another and thereby reverse the direction in which said wheel is driven at intervals defined by a given number of drive arm oscillations, a movable control member mounted on said plate, an actuating member pivotally mounted on said drive arm for actuating said control member at said intervals, said actuating member mounted for pivotal movement between two actuating positions by said reversing means, and a detent member pivotally mounted on said plate adapted to engage said ratchet wheel and properly position and hold said wheel for step-by-step actuation thereof by said drive pawl, said detent member actuated by said control member between two ratchet wheel engaging positions corresponding to the direction said ratchet wheel is being driven by said drive pawl.

2. A device according to claim 1 in which said reversing means includes a reversing link pivotally mounted on said drive arm and a pair of angularly spaced abutments carried by said ratchet wheel adapted to be engaged by said reversing link causing it to pivot at said intervals, said detent member serving to hold said wheel stationary as said reversing link is moved against said abutments and thereby cause said reversing link to pivot as said drive arm is oscillated.

3. A device according to claim 1 in which there are safety means carried by said control member for preventing the drive pawl and detent member from being inadvertently manipulated to non-cooperating positions.

4. A device according to claim 3 in which said safety means includes a pair of leaf springs fastened to said control member opposite said engaging portions of said actuating member to prevent said engaging portions from overriding said abutments on said control member in the event said actuating member is inadvertently pivoted from one position to another.

5. A device of the character described comprising a mounting plate, a drive arm pivotally mounted on said plate, means for oscillating said drive arm, a ratchet wheel freely rotatably mounted on said plate, a drive pawl pivotally mounted on said drive arm for movement between one driving position and another, said drive pawl adapted to drive said ratchet wheel step by step in either direction when said drive arm is oscillated depending on the position of said drive pawl, reversing means adapted to pivot said pawl from one driving position to another and thereby reverse the direction in which said wheel is driven at intervals defined by a given number of drive arm oscillations, and a double-sided detent pivotally mounted for movement between one position and another depending on the direction in which said ratchet wheel is being driven by said drive pawl, said reversing means adapted to pivot said detent from one position to another at said intervals defined by a given number of drive arm oscillations.

6. A device according to claim 5 in which said reversing means includes a pair of angularly spaced abutments carried by said ratchet wheel and adapted to actuate said drive pawl and detent to pivot them from one position to another at said intervals defined by a given number of drive arm oscillations.

7. A device according to claim 6 in which one of said abutments is fastened to an indicator arm rotatably mounted at the center of said ratchet wheel to permit adjustment of the angular spacing of said abutments to thereby vary the number of drive arm oscillations between said intervals.

8. A device of the character described comprising, a mounting plate, a pivotally mounted drive arm, means for oscillating said drive arm, a control member adapted to perform a control function when actuated, and counting means for actuating said control member when a preset number of drive arm oscillations is reached and for repeating actuation of the control member upon each succeeding series of preset drive arm oscillations, said counting means including a ratchet wheel freely rotatably mounted on said mounting plate, a drive pawl pivotally mounted on said drive arm adapted to drive said wheel step-by-step in either direction when said drive arm is oscillated, and a double-sided detent pivotally mounted for movement between one position and another depending on the direction in which said ratchet wheel is being driven by said drive pawl, said detent adapted to engage said ratchet wheel and properly position and hold said ratchet wheel for step-by-step actuation thereof by said drive pawl.

References Cited in the file of this patent

UNITED STATES PATENTS

| | | |
|---|---|---|
| 315,883 | Arnold | Apr. 14, 1885 |
| 489,892 | Balzer | Jan. 10, 1893 |
| 547,860 | Paige | Oct. 15, 1895 |
| 938,478 | Greenfield | Nov. 2, 1909 |
| 2,505,991 | Reinhold | May 2, 1950 |
| 2,558,953 | Henninger | July 3, 1951 |